United States Patent [19]

Obsomer et al.

[11] 4,116,609
[45] Sep. 26, 1978

[54] APPARATUS FOR THE CONTINUOUS PRODUCTION OF ORIENTED HOLLOW BODIES

[75] Inventors: Marc Obsomer, Brussels; Luc Bodson, Grez-Doiceau; Edmond Michel, Brussels, all of Belgium

[73] Assignee: SOLVAY, & Cie., Brussels, Belgium

[21] Appl. No.: 849,446

[22] Filed: Nov. 7, 1977

Related U.S. Application Data

[63] Continuation of Ser. No. 647,072, Jan. 7, 1976, abandoned.

[30] Foreign Application Priority Data

Jan. 7, 1975 [LU] Luxembourg ............................ 71598
Jun. 27, 1975 [LU] Luxembourg ............................ 72853

[51] Int. Cl.$^2$ ............................................. B29D 23/03
[52] U.S. Cl. .................................. 425/526; 425/534; 425/539
[58] Field of Search ............... 425/526, 534, 539, 532, 425/527, 530

[56] References Cited

U.S. PATENT DOCUMENTS

| 3,324,507 | 6/1967 | Arlo | 425/526 |
| 3,767,747 | 10/1973 | Uhlig | 425/532 |
| 3,849,530 | 11/1974 | Wyeth | 425/529 |
| 3,873,660 | 3/1975 | Reilly et al. | 425/530 |
| 3,880,301 | 4/1975 | Reilly | 425/526 |

FOREIGN PATENT DOCUMENTS

869,004 4/1971 Canada ...................... 425/534

*Primary Examiner*—Richard B. Lazarus
*Attorney, Agent, or Firm*—Spencer & Kaye

[57] ABSTRACT

Apparatus for the continuous production of oriented hollow bodies from a thermoplastic, which includes a device for the production of a continous tubular parison from a thermoplastic. There is also a machine for blowing preforms which is fed with the continuous tubular parison and of which the molds, aligned end to end contiguously on a first rotary carrier, make it possible to produce separate preforms of which the neck is molded to its definitive or ultimate shape. A device is provided for deflashing the neck of the preforms, as is a device for thermal conditioning which brings the preforms to their optimum orientation temperature. A final blowing machine is used which includes a plurality of molds mounted on a second rotary carrier as is a transfer device which bring the preforms from the preform blowing machine to the final blowing machine while causing them to pass successively through the deflashing device and the thermal conditioning device. The preform transfer device includes an endless chain provided with carriers so arranged so as to support the preforms below their neck, which has already been molded.

11 Claims, 6 Drawing Figures

APPARATUS FOR THE CONTINUOUS PRODUCTION OF ORIENTED HOLLOW BODIES

CROSS REFERENCE TO RELATED APPLICATION

This application is a continuation of application Ser. No. 647,072, filed Jan. 7, 1976, now abandoned.

BACKGROUND OF THE INVENTION

The present invention relates to an apparatus for the continuous production of oriented hollow bodies from a thermoplastic and which provides very high productivity.

It is known to produce hollow bodies having improved mechanical properties from a thermoplastic, by effecting the expansion and final shaping of preforms which are at a temperature which induces a molecular orientation. In general, the preforms are employed at a temperature below the crystalline melting point of the thermoplastic of which they are made.

Numerous techniques have been developed for the industrial-scale production of oriented hollow bodies from thermoplastics. One of the most attractive techniques comprises producing preforms by blowing a portion of a tubular parison in a preform mold, bringing these preforms to a suitable temperature for their orientation and then introducing them into molds in which the final molding by blowing is carried out.

An apparatus which exploits this technique is described in U.S. Pat. No. 3,767,747 assigned to Owens Illinois Glass Co.

This apparatus comprises two molding units, each comprising a preform mold and a final blowing mold, located on either side of an extrusion installation which delivers a tubular parison. Each unit executes a reciprocating movement so as to present its preform mold under the extrusion head and then under blowing nozzles, also located on either side of the extrusion installation.

However, taking into account the sequenced movement of the molding units, the necessarily limited number of molds and the need to keep each preform in its preform mold for a sufficient period to permit its thermal conditioning, this type of apparatus only achieves low production.

SUMMARY OF THE INVENTION

The present invention has as its main object to provide an apparatus for the continuous production of oriented hollow bodies from a thermoplastic, starting from blow-molded preforms, which achieves extremely high production.

The apparatus according to the present invention comprises a device for the production of a continuous tubular parison from a thermoplastic. A machine for blowing preforms is fed with the continuous tubular parison. The molds, aligned end to end contiguously on a first rotary carrier, make it possible to produce separate preforms of which the neck is molded to its ultimate or definitive shape. A device is provided for deflashing the neck of the preforms. There is also a device for thermal conditioning which brings the preforms to their optimum orientation temperature, and a final blowing machine which comprises a plurality of molds mounted on a second rotary carrier and a transfer device which brings the preforms from the preform blowing machine to the final blowing machine while causing them to pass through the deflashing device and the thermal conditioning device. In this apparatus the preform transfer device comprises an endless chain provided with carriers so arranged as to support the preforms below their necks, which have already been molded.

The preforms which are transported by the endless chain are of generally cylindrical shape. Their bottom parts can have any desired shape. They can, for example, terminate in an edge similar to a toothpaste tube, or can be hemispherical, as in test tubes used in chemical laboratories. Their neck parts already have the definitive shape of the necks of the definitive hollow bodies. Their central parts are substantially cylindrical.

The carriers comprise seats arranged vertically, which are open at least in their upper parts, and which also have a generally cylindrical shape and, preferably, a slightly greater diameter than that of the central parts of the preforms, so as to grip these loosely in order not to damage them. Preferably, these seats do not have a bottom so as not to damage the bottom parts of the preforms. In that case, the preforms must be provided with an annular bulge in their neck part. Such a bulge is not objectionable on the preforms because it must in any case be produced on the definitive hollow bodies so as to allow them to be stoppered.

A particularly advantageous embodiment of the carriers comprises forming them by means of two jaws which can move apart and which are so designed as to form a bottomless cylindrical seat between them in the closed position. The jaws are moved apart so as to facilitate placing the preforms in the carriers and facilitate their gripping, which is needed to transfer them to the final blowing machine. The jaws grip the central parts of the preforms. Their height is not critical.

The carriers are fixed at regular intervals on an endless chain. The endless chain, preferably having vertical link-pins, can easily be supported, driven and guided by means of gearwheels. Furthermore, it allows the carriers to be positioned correctly relative to the various devices and machines. However, it is also possible to use any other means of transfer which can provide the same functions as the endless chain, such as, for example, a notched belt.

It is desirable that the spacings of the carriers and the speed of travel of the endless chain should be so chosen that all the preforms can be transferred from the preform blowing machine to the final blowing machine with each carrier of the chain containing one of the preforms between the two machines. It is therefore necessary that the two blowing machines and the endless chain should be capable of operating at the same speed.

The preforms are discharged from the preform blowing machine at regular intervals of time. Each time a preform presents itself, a carrier should be ready to receive it. It is thus necessary that the discharge of the preforms and the travel of the carriers should be synchronized perfectly. In order to ensure this synchronization it is of course necessary to choose correctly the geometry of the various elements.

On the other hand, the take-up of the preforms by the carriers must be possible for different speeds of rotation of the rotary carrier of the preform blowing machine. This result can advantageously be achieved by driving the endless chain by the same motor as that which revolves the rotary carrier of the preform blowing machine.

This makes certain that the linear speed of travel of the endless chain always varies proportionately to the speed of rotation of the preform blowing machine and consequently the endless chain can correctly perform its function in relation to this machine, regardless of the speed of rotation of this machine.

Of course it is also necessary that the final blowing machine should be so designed that it takes up and blows the successive preforms transported by the endless chain. The correct feed of the final blowing machine in relation to the endless chain requires that there should be synchronization between the travel of the carriers of the endless chain in the zone where this feed takes place and the travel of the means of picking up the preforms in order to introduce them into the final blowing machine.

This result would be achievable by driving the final blowing machine via the endless chain. However, the very high inertia of the final blowing machine would make it necessary to employ an oversized endless chain. The inventors therefore prefer to satisfy the above condition by driving the final blowing machine by the same motor as that which drives the preform blowing machine, and to do so via appropriate transmissions.

According to a preferred embodiment, the two rotary carriers of the blowing machine are thus driven by a single motor and this motor also drives the endless chain for the transfer of the preforms. By using this method, it is possible to ensure a correct overall functioning of the apparatus and its rate can be modified by making a single adjustment, that is to say adjusting the single drive motor.

According to the preferred embodiment of this variant, the endless chain is equipped with tensioning devices and is driven indirectly and doubly via each of the two blowing machines.

The inventors have in fact found that if the endless transfer chain is driven directly by the motor or via only one blowing machine, the synchronization of the endless chain in relation to the machines which do not participate in driving the chain is not always properly ensured. As a result of this, the inventors have found that there periodically occur slight fluctuations in the travel of the carriers of the chain in relation to the blowing machines. These drifts are particularly due to the play which can exist between the various movable elements of the apparatus and to the heat cycle which the endless chain, which passes through a thermal conditioning device together with the preforms, undergoes.

Proceeding in the proposed manner, the positioning of the carriers is controlled in relation to each of the two blowing machines. The slight temporary variations in speed of the endless chain near the two blowing machines are taken up and compensated by an automatic shift in the tensioning devices. This avoids any danger of breakage of the chain. It is furthermore possible to provide contacts which automatically stop the motor if one of the tensioning devices exceeds a permitted shift. Preferably, the tensioning devices number two and are arranged on each of the sections of endless chain between the two drive positions of the chain.

In the preform blowing maching, it is important that the successive molds placed end to end should be as contiguous as possible because this machine is fed with a continuous parison and consequently any space separating two successive molds entails a loss of material.

On the other hand, in the final blowing machine, the molds can be spaced apart because each of them is intended to receive an independent preform.

The apparatus according to the invention is furthermore explained in greater detail in the description of its preferred practical embodiment which now follows. However, it is to be understood that this description does not in any way imply a limitation.

DESCRIPTION OF THE PREFERRED EMBODIMENTS

Figure 1:
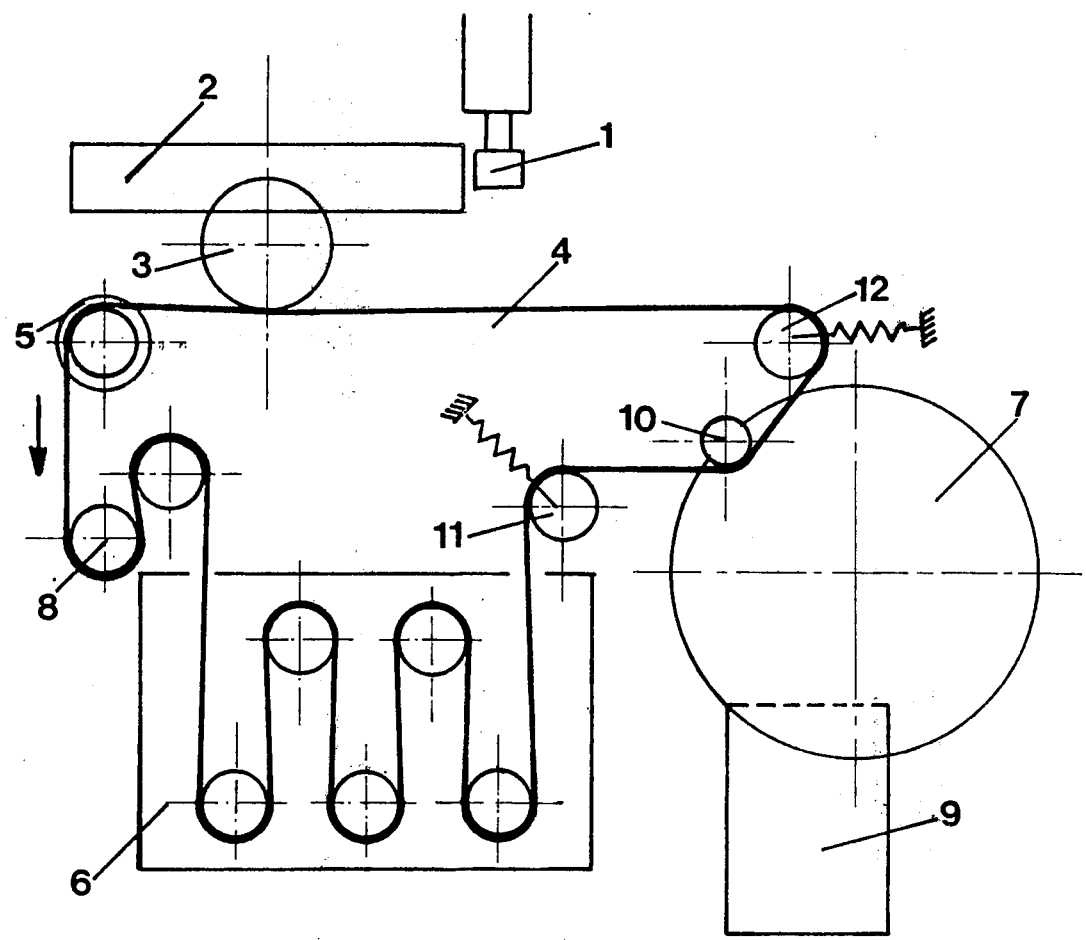
FIG. 1 is a schematic plan view of an apparatus according to the invention.

As can be seen in FIG. 1, the apparatus according to the invention comprises a device 1 for the production of a continuous tubular parison, a first rotary carrier 2, with a horizontal axis of rotation, which supports contiguous preform molds arranged end to end so as to receive the continuous tubular parison, and a mold release device 3 which extracts successive preforms from their mold and introduces them into the hinged jaws of the successive carriers mounted on an endless transfer chain 4. The endless chain 4 causes successive preforms to travel through a neck deflashing device 5 and through a thermal conditioning chamber 6. The endless chain 4 thereafter ensures the correct presentation of the deflashed and thermally conditioned preforms for the purpose of introducing them into the final blowing molds located on a second rotary carrier 7 having a vertical axis of rotation.

As will be described below, the apparatus can be supplemented with a cooling device 8 for the preforms, provided between the deflashing device 5 and the thermal conditioning chamber, and with a reheating oven 9 which follows the final blowing device 7 and is intended to receive the oriented hollow bodies taken out of the latter.

The endless chain 4 is driven doubly in the zone of the mold release device 3 or of the deflashing device 5 and in the zone of the device 10 for transferring the preforms into the final blowing molds. The endless chain 4 is equipped with two tensioning devices 11 and 12 located on each of the sections of endless chain between the two drive positions of the chain.

Figure 2:
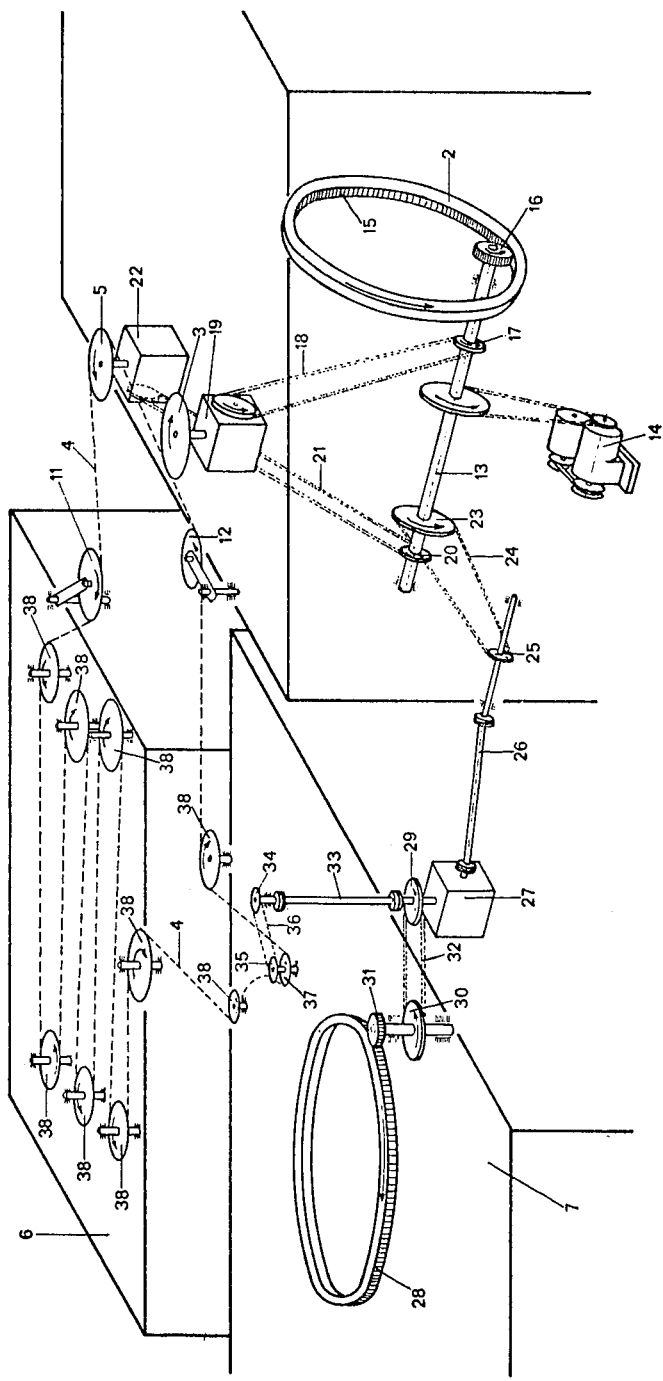
FIG. 2 is a schematic perspective view which shows the drive system of the apparatus.

As can be seen more clearly from FIG. 2, the mechanical drive of the various movable parts of the apparatus is effected by means of a rotating shaft 13 which is rotated by a variable-speed motor unit 14 which constitutes the sole source of energy which drives the whole apparatus.

Thus, the first rotary carrier 2, represented schematically by its toothed drive rim 15, is driven directly by a gearwheel 16, fixed on the rotating shaft 13 and engaging in the toothed rim 15.

A gearwheel 17, also fixed on the shaft 13, drives, via the chain 18 and the bevel gear 19, the device 3 which transfers the molded preforms onto the transfer chain 4.

Another gearwheel 20, fixed on the shaft 13, drives, via the chain 21 and the bevel gear 22, the device 5 which deflashes the necks of the preforms.

A last gearwheel 23, fixed on the shaft 13, drives an intermediate Cardan shaft 26 via the chain 24 and the gearwheel 25. This shaft 26 provides, via the bevel gear 27, firstly the drive of the toothed rim 28 which is integral with the second rotary carrier 7, via the gearwheels 29, 30 and 31 and the chain 32, and secondly, the first drive of the transfer chain 4, via the shaft 33, the gearwheels 34 and 35, the chain 36 and the gearwheel 37 which engages with the chain 4.

The transfer chain 4 is also driven in the zone of the preform blowing unit. This drive can be provided either by the deflashing device 5 or by the preform transfer device 3 or by both these devices.

The path followed by the transfer chain 4 is imposed by the idler gearwheels 38 and two tensioning devices 11 and 12 are provided on each segment of the endless chain between the two drive positions of the transfer chain 4.

The position of the tensioning devices is not critical as long as each is on one of the segments of the endless chain 4 between the drive positions. Thus, in FIG. 1, the tensioning devices 11 and 12 occupy different positions.

In FIG. 2, arrows indicate the direction of rotation or travel of all the drive components.

It can thus be seen clearly that all the moving components of the apparatus are driven by the single motor 14 via the shaft 13, which makes it possible to ensure perfect synchronization during operation.

Furthermore, the transfer chain 4 is driven at two points located in the zones where the chain receives the molded preforms and where it delivers these preforms to the final blowing machine, and hence this chain is perfectly synchronized at its points of contact with the other components of the apparatus, notwithstanding possible stretching of the chain.

In FIGS. 1 and 2, the practical details of realization of each constituent element of the apparatus have deliberately been omitted for the sake of clarity. These details are explained below.

The device 1 for the extrusion of the continuous tubular parison, shown schematically in FIG. 1, does not exhibit any inherent special feature compared to known conventional devices. However, an extruder should be chosen which has an output compatible with the high production capacity of the apparatus for the production of oriented hollow bodies which the extruder must feed. Furthermore, the extrusion device can be equipped with a system for programming the wall thickness of the continuous tubular parison which is produced.

As has been stated, the first rotary carrier 2 is equipped with contiguous molds arranged end to end, the internal cavity of the molds reproducing the shape of the desired preform. According to the preferred variant which is illustrated, this carrier, driven by the rim 15, revolves at constant speed about a horizontal axis and successively presents the various molds mounted on its periphery at right angles to the tubular parison extruded continuously and tangentially to this rotary carrier.

The preform blowing machine can be of the same general design as the rotary machine for blowing hollow bodies described in Belgian Pat. No. 723,419 filed on Nov. 6, 1968 by Solvay et Cie., and corresponding U.S. Pat. No. 3,585,682 issued on June 22, 1971, except that each mold only produces one preform and not two preforms welded together by the neck.

The rotary carrier 2 thus comprises a series of equidistant arms located radially in a plane perpendicular to a rotary shaft, the end of each of these arms being provided with a molding unit preferably comprising a fixed mold-half integral with the arm and a movable mold-half articulated by a hinge on the fixed mold-half. Cam controls are provided for closing the successive molds at the instant that their rotation brings them at right angles to the continuous tubular parison delivered by the extrusion device, for locking the molds in the closed position, for controlling the blow-molding of the parison portions enclosed in these molds, for unlocking the molds before they are opened and for opening the unlocked molds so as to make it possible to extract the molded preforms.

Preferably, the cavity of each mold reproduces the shape of a preform which has a closed false neck and a hemispherical bottom, as described in French patent application No. 74/09,380 filed on Mar. 15, 1974 by Solvay et Cie. and illustrated by FIG. 1 of that patent application, and in corresponding U.S. Pat. No. 4,049,761 issued on Sept. 20, 1977.

Devices for deflashing the bottom of the preforms, such as described in this French Patent Application, can advantageously be provided between the contiguous molds with which the rotary carrier is equipped and can be controlled by cams so as to permit the direct production of separate preforms of which the hemispherical bottom is perfectly deflashed.

The cavity of each mold can thus advantageously correspond to the shape of the preforms described in French patent application No. 74/05,461, filed on Feb. 14, 1974 by Solvay et Cie., and more especially to FIGS. 1 to 5 of this patent application, and in corresponding U.S. Pat. No. 4,007,242 issued on Feb. 8, 1977. The deflashing of the bottom of these preforms does not present any problem because the bottom is in the shape of a straight edge.

The diameter of the cavity of the molds and hence the diameter of the preforms produced is only slightly greater than the diameter of the initial tubular parison so as to keep the radial stretching of this tubular parison, during the molding of the preform, to a value of less than 20%. In fact, in this stage, the stretching of the parison should be restricted because, bearing in mind the relatively high temperature of the thermoplastic material of which the parison is made, this stretching does not produce any molecular orientation.

The preform is preferably molded by blowing by means of a hollow needle connected to a source of a fluid under pressure. This needle pierces the tubular parison at a point beyond the desired molded neck, that is to say in a portion of the parison which is employed to form a closed false neck which is subsequently removed.

The hollow blowing needle is preferably mounted on a movable control block arranged at the side of the fixed mold-half, the movements of this block being controlled by the rotation of the movable carrier which supports the molds, and by cams.

Figure 3:
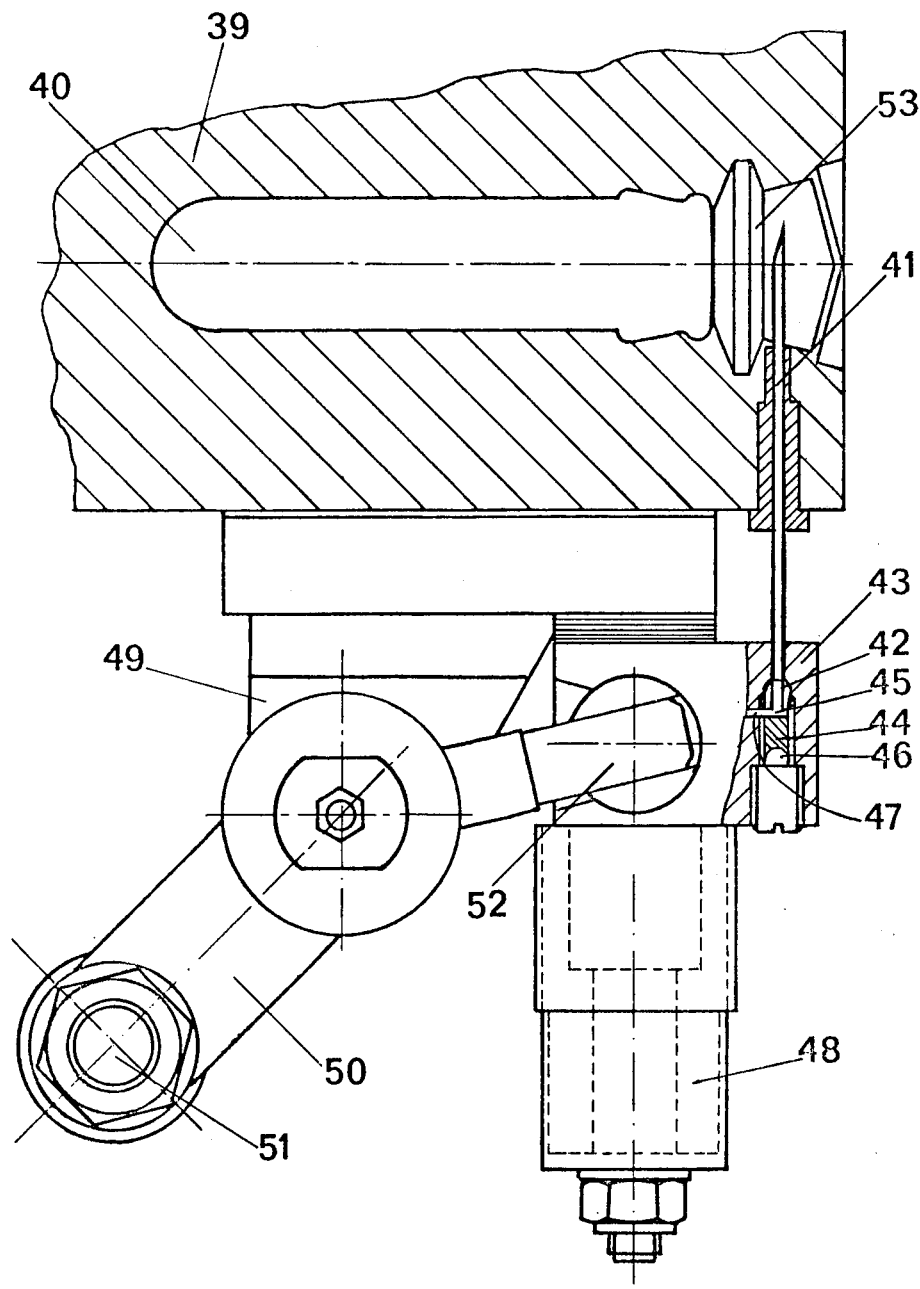
FIG. 3 is a view, partially in section, of a fixed mold-half for a preform, which shows the control device for the hollow blowing needle.

A preferred embodiment of this device is shown in FIG. 3. As can be seen in this figure, the fixed mold-half 39, of which the cavity 40 reproduces the shape of a preform having a hemispherical bottom, is provided with a blowing device particularly comprising a movable hollow needle 41 having a conical base 42. This needle 41 is inserted into a seat provided in the control block 43, the bottom of which has a conical part corresponding to the conical base 42 of the needle. The needle 41 is held in the bottom of the seat by a clamping screw 44. The end of this screw is provided with a central channel located in the extension of the central channel of the needle and connected to the walls of the screw by radial channels 45. Furthermore, the end of the clamping screw 44 has a diameter which is such that an annular space or chamber 46 remains between the periphery of the seat in the control block 43 and the periphery of the end of the clamping screw 44. A channel 47 provided in the control block 43 opens into the annular space 46. This channel 47 is connected to a source of fluid under pressure via a control valve which is not shown. The control block 43 is mounted on a carrier 48 which is integral with the side wall of the fixed mold-half 39, in such a way that the block can slide in this carrier. The travel of the control block 43 on this carrier and along a direction at right angles to the axis of the fixed mold-half 39 is brought about, in both directions, by the pivoting of a control lever mounted on a carrier 49 integral with the fixed mold-half 39. One of the arms 50 of the lever, equipped with an idler pulley or cam follower 51, can be shifted, for example by the action of fixed cams, which are not shown, during the rotation of the rotary carrier which supports the preform molds, while the other arm 52 acts on the position of the control block 43 on its carrier 48. Thus, as can also be seen from the figure, the needle is arranged so as to penetrate into the cavity 40 in the zone 53 which defines the formation of a closed false neck on the molded preform.

The system of mounting the needle makes it possible, where necessary, rapidly to replace the blowing needle because all that is required is to unscrew the clamping screw 44 in order to take out the needle from its seat in the control block 43. The new needle is placed in position simply by introducing the needle, by its point, into the seat, and replacing the clamping screw 44. The presence of the chamber 46 and of the radial channels 45 avoids any need for special positioning of the needle 41 in its seat.

Apart from this feature, the design and functioning of the device for the blow-molding of the preforms are practically identical with those described in the abovementioned Belgian Pat. No. 723,419 and it is therefore not necessary to describe them in greater detail.

The mold release and extraction of the molded preforms, when the preform molds are open, are preferably effected by means of a mold release device like that described in Belgian Pat. No. 772,264 filed on Sept. 7, 1971 by Solvay et Cie., and corresponding U.S. Pat. No. 3,770,098 issued on Nov. 6, 1973. However, the preforms extracted by the joint action of the ejectors of the preform molds and the gripping devices located on the arms with which the mold release device is equipped are not deposited on a conveyor as described in Belgian Pat. No. 772,264 but are simply transferred into the carriers with articulated jaws located on the endless transfer chain 4. This transfer does not present any particular synchronization problem because the endless chain 4 is driven in the vicinity of the mold release device 3 which is itself driven by the rotary platen of the preform blowing machine. This guarantees perfect synchronization of the movements of the gripping members of the mold release device with those of the carriers with articulated jaws mounted on the endless chain 4.

Preferably, the size of the mold release device, the spacing of the carriers on the endless chain, and the gearing-down of the transmission between the mold release device and the endless chain are so chosen that the preforms are subjected to the same linear speed at the precise moment at which they leave the mold release device and at the moment at which they are carried away by the endless chain. This causes the apparatus to operate entirely without jerkiness.

Figure 4:
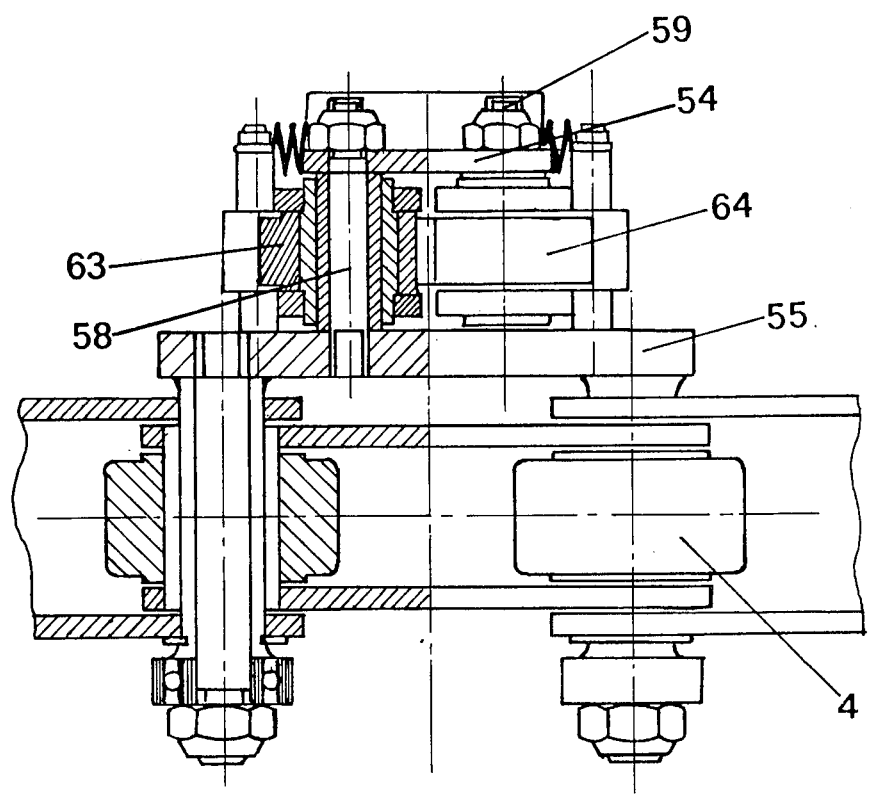
FIGS. 4 and 5 are a front view and a plan view, respectively, of a portion of the endless chain for the transfer of preforms, showing one of the carriers with which this chain is equipped.
Figure 5:
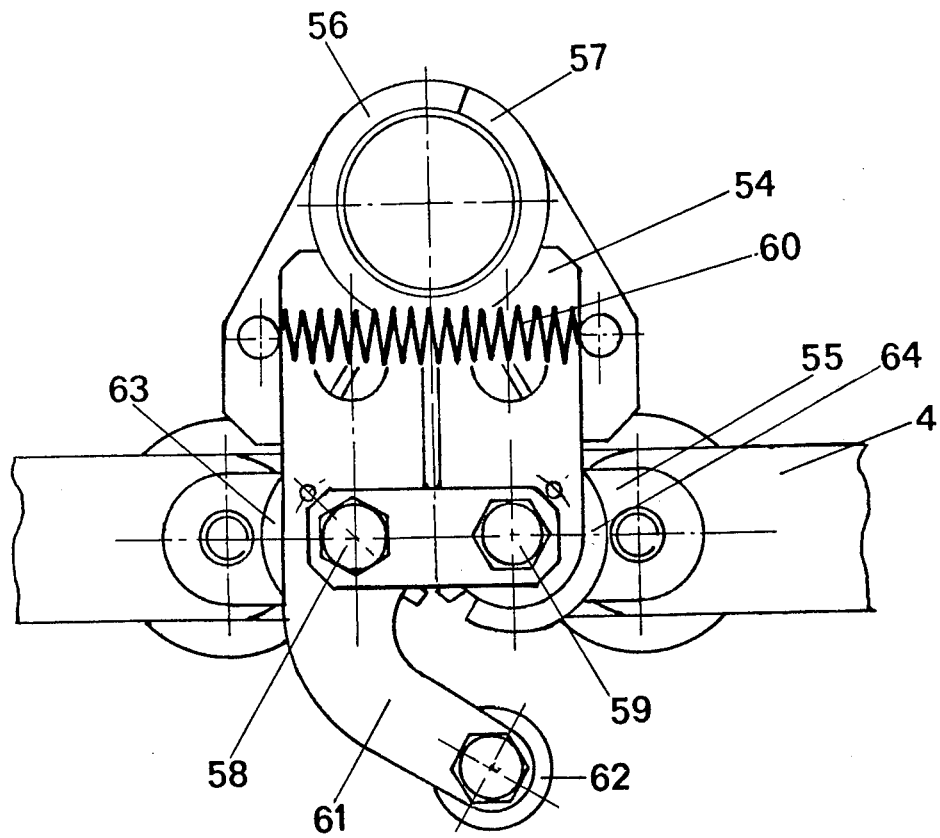

FIGS. 4 and 5 of the attached drawings illustrate a segment of the endless chain equipped with a carrier with articulated jaws. As can be seen in these figures, the carrier with articulated jaws 54 is mounted on a plate 55 fixed to the links of the endless chain 4. This carrier comprises two movable jaws 56 and 57 articulated about pivots 58 and 59 fixed to the plate 55. A spring 60 biases the jaws toward the closed position. One of the jaws 56 is provided with a lever arm 61 equipped with an idler pulley or cam follower 62 for control purposes. Furthermore, two gearwheels 63 and 64 engaging with one another are respectively fixed on each jaw, in the position of the pivots.

The opening of the articulated jaws is controlled by the control pulley or cam follower 62 encountering a fixed profiled cam, which is not shown, in the path of the pulley. This cam causes the jaw 56 to pivot under the action of the lever arm 61 and this pivoting at the same time causes the pivoting, in the opposite direction, of the other jaw 57, via the gearwheels 63 and 64. The cam is so arranged that, for example, the jaws are in the open position at the instant that a preform extracted from the preform blowing machine is seized by the mold release device and that it causes abrupt closing of the jaws under the action of the spring 60 at the instant at which the preform is released by the mold release device.

The preforms are seized by the arms of the mold release device just below the neck. When they are released from these arms, they drop by gravity into the seat formed by the jaws of their carrier, which have previously been closed. They are held by the annular bulge which their neck portion possesses.

During opening of the preform molds, the molded preforms should remain held in the fixed mold-half throughout to enable them to be taken over by the mold release device. The inventors have found that this condition could be fulfilled reliably by keeping the blowing needle 41 stuck into the cavity 40 of the fixed mold-half until the time at which the mold is partially open. In this way the needle in effect retains the preform in the fixed mold-half.

This result is achieved, for example, by so arranging the cam which controls the retraction of the needle 41 that the cam only acts on the lever 50 after the corresponding mold has been partially opened. In this case, the blowing should be discontinued before the mold is opened.

This condition can also be fulfilled by means of mold ejectors, as has been described in the previously mentioned Belgian Pat. No. 723,419. In this case, the ejector in the rest position is retracted into its seat below the level of the bottom of the mold cavity.

Figure 6:
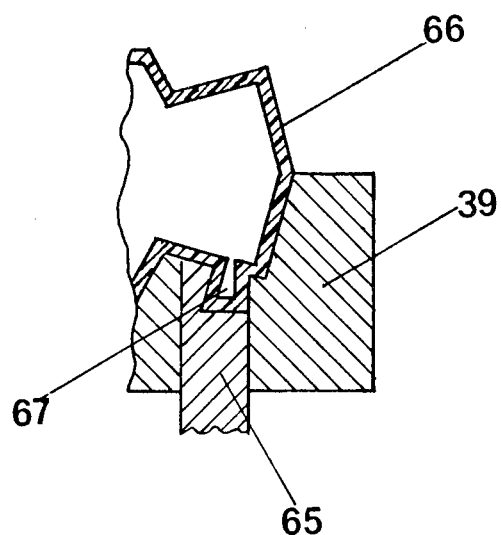
FIG. 6 is a view, partially in section, of a fixed mold-half for a preform, showing a different embodiment of the ejection.

Another technique which also employs ejectors is illustrated by FIG. 6 of the attached drawings. As can be seen in this figure, the ejector 65, shown in its rest position, is flush with the level of the bottom of the cavity 40 of the fixed mold-half 39 and has a cut-out in the shape of a half-dovetail in its upper part. Thus, during blowing of the preform 66 a part of the thermoplastic penetrates into the cavity 67 determined by this cut-out and during subsequent opening of the mold, the preform remains hooked in the fixed mold-half 39. The extraction of the preform 66 does not present any problem because when the ejector has introduced the neck of the preform into a gripper with which the mold release device is equipped, the arm which supports this gripper disengages the preform from the notch of the ejector.

The preforms which have been released from the mold and transferred into the carriers with articulated jaws 54, located on the endless transfer chain 4, are then carried through a deflashing device which cuts off their false neck.

This operation can advantageously be carried out by means of a deflashing device based on the principle described in Belgian Pat. No. 673,913 filed on Dec. 17, 1965 by Solay et Cie., and corresponding U.S. Pat. No. 3,429,211 issued on Feb. 25, 1969.

In such a device, the flash or false neck is cut off by a fixed knife while the preforms are caused to undergo a translational movement along the knife and a simultaneous rotational movement about their longitudinal axis.

The translational movement can be brought about by a rotary platen equipped with idler pulleys of appropriate profiles and corresponding to the profile of the false neck. These preforms are thus held at their neck, caused to travel through the deflashing device, and caused to rotate about themselves between two idler pulleys and a fixed guide of appropriate geometry. The platen can be caused to rotate by the endless chain 4 itself, at a speed such that the translational speed of the preforms is exactly equal to the linear speed of travel of this chain. According to another variant, this platen can be driven directly by the motor which actuates the two blowing machines. In that case, the platen can drive the endless transfer chain at a speed compatible with the speed of rotation of the blowing machines. This drive can supplement, or be substituted for, the drive provided at the mold release device, and in that case the latter can be uncoupled from the endless chain.

As a result, the drive of the endless chain in the zone of the first blowing machine can be effected either via the mold release device or via the deflashing device or via any other intermediate device coupled to the motor which drives the two blowing machines.

The rotary platen is preferably equipped with idler pulleys which are so profiled as to fit the profile of the false necks of the preforms, and the fixed guide is also profiled in the same way, so as to achieve correct positioning of the preforms when the flash is cut off. The preforms must be held in their carriers while they pass through the deflashing device. They can also be lifted slightly while passing through, and need no longer rest on the annular bulge of their neck portion.

In that case, in order not to impede the rotary movement imposed on the preforms during deflashing, it is obviously necessary that the preforms should not be held firmly in the carriers, with articulated jaws, of the endless transfer chain 4, at least while they are passing through the deflashing device. For this purpose, the articulated jaws are preferably so constructed that in the closed position they only loosely surround the body of the preforms, the latter thus being suspended in the jaws and held by their molded neck. To facilitate the rotation of the preforms, a profiled fixed cam can be provided so as to cause the articulated jaws to open at theinstant at which the preforms enter the deflashing device and to cause the jaws to close onto the preforms at the instant at which they leave the deflashing device. In this latter case, the holding pulleys provided on the rotary platen and the circular fixed guide must be profiled so as to hold the preforms not only by the false neck but also at their true neck during deflashing, so that the preforms remain held between these components even after the false neck has been completely cut off, and can thus be taken up again by the carriers with articulated jaws on issuing from the deflashing device. However, this modification is not necessary if the cam is profiled as to reclose the jaws of the carriers at the precise instant at which the cutting-off of the neck flash is completed.

In the course of blow molding in the molds with which the first blow-molding machine is equipped, the molded preforms are cooled, for example by circulation of a coolant fluid through the walls of the molds, so as to permit mold release of the preforms without the danger of deforming them. Furthermore, because these preforms must subsequently undergo an orientation treatment, the cooling during the molding of the preforms must be regulated so that the preforms released from the mold have an average wall temperature which is within the appropriate temperature range for their subsequent orientation. Inevitably, the outer wall of the preform, which is in contact with the wall of the mold cavity during molding, is cooled more than the inner wall.

Thus, for example, if the coolant fluid is water at ambient temperature, the outer wall of the preform is at a temperature of about 30° C. when released from the mold while its inner wall remains at a temperature close to the extrusion temperature. As a result, the preform, at the instant at which it is released from the mold, has a temperature gradient, through its thickness, which can range from ambient temperature (at the outer wall) to the extrusion temperature (at the inner wall).

During the subsequent transfer of the preforms, this gradient tends gradually to disappear and the wall of the preforms ultimately has a constant or practically constant mean temperature throughout its thickness.

The cooling of the preform molds should be regulated, for each thermoplastic employed, so that this final mean temperature is compatible with the subsequent orientation treatment. However, taking into account the high cycle speeds of the production of the preforms, it can happen, particularly when working with relatively thick tubular parisons, that the mold cooling proves insufficient for the preforms to be able finally to be at a sufficiently low mean temperature to allow efficient subsequent orientation.

In order to increase the eficiency of cooling during the molding of such preforms it is possible to provide, where necessary, that at the end of blowing, the preforms are flushed internally with a very cold fluid such as let-down liquid nitrogen injected through the hollow needle. However, this technique has proved rather inefficient, bearing in mind the low volume of the preform. Furthermore, if this method is used, the internal cooling is confined to the false neck zone and there is a danger that the subsequent removal of the neck can become more erratic.

To finish off the cooling of the preforms where necessary, the inventors have found, and this is one of the aspects of the invention, that it is preferable to resort to internal flushing of the preforms with a cold fluid after removing the false necks. This result can be achieved by insertion into the preforms, from which the necks have been removed, nozzles connected to a source of a very cold fluid such as let-down liquid nitrogen. By varying the speed of introduction and/or of withdrawal of the nozzles and the distance to which the nozzles are inserted, it is furthermore possible to establish a temperature gradient along the axis of the preforms, which can prove beneficial in certain cases.

This subsequent cooling operation can advantageously be carried out on a circular carousel such as is shown schematically at 8 in FIG. 1, the carousel being driven by the preform transfer chain or by the same motor as the blowing machines. In that case, the movement of the cooling nozzles mounted on the carousel can be controlled by fixed cams. Where desired, it is also possible to provide cooling of the external wall by blowing a cold fluid over it.

After having passed through the deflashing device and, where relevant, through the devices for cooling by internal flushing, the preforms supported by the endless transfer chain 4 travel through a thermal conditioning chamber 6 kept at the chosen temperature for carrying out the final blowing or at a temperature slightly below or slightly above this value. In practice, the temperature of the chamber is regulated by trial and error so that the preforms which leave this chamber are at the optimum temperature for orientation and their temperature is practically identical at every point of their thickness.

On issuing from this oven, the preforms are introduced into the final blowing molds mounted on the second rotary carrier, which may be arranged in any desired way. This latter carrier preferably revolves about a vertical axis and supports molding units comprising two mold-halves which can be separated axially. These molding units need not necessarily be contiguous.

The transfer of the preforms into the blowing molds is preferably effected by means of blowing nozzles integral with the rotary carrier, which seize the preforms by their molded neck at the instant at which their carrier with articulated jaws opens, the opening being controlled by a profile fixed cam, and introducing them vertically into the successive final blowing molds travelling underneath the endless transfer chain, it being possible to control these movements, for example, by fixed cams.

As has been stated, the perfect synchronization of this transfer is ensured by the fact that, firstly, the rotary carrier of the final blowing machine is driven by the same motor as the rotary carrier of the preform blowing machine and, secondly, the endless transfer chain is driven, in the zone of the final blowing machine, by a drive device which is coupled to this machine.

In the case of the final blowing machine it is again desirable, in order that the apparatus shall function without jerkiness, that the geometry and speed of rotation should be so chosen that the linear speed of the nozzles is equal to that of the endless chain. After each final blowing mold has been closed, the corresponding blowing nozzle effects the final molding by blowing of the conditioned preform.

Preferably, the length of the preforms is less than that of the desired oriented hollow bodies, and the ratio of the length of the final hollow body to the length of the preform can very between 1 and 5. In this way, the preforms are stretched both axially and radially during blowing, which gives them a biaxial orientation and as a result gives them excellent mechanical properties. The blowing nozzles can advantageously be equipped with a movable central piston which ensures correct centering of the bottoms of the preforms during the final blowing.

After blowing and cooling, the oriented hollow bodies are removed when the blowing mold opens, and fall out under gravity. According to a preferred variant, this operation is facilitated by withdrawing the blowing nozzle at the start of the opening of the corresponding mold, so that the molded hollow body engaged on the blowing nozzle is held by the upper shoulders of its mold and is thus disengaged from the nozzle. The disengagement from the nozzle can also be made more reliable by injecting a supplementary amount of blowing fluid during withdrawal of the nozzles and/or by imposing a supplementary travel on the centering piston with which the nozzles are equipped.

The oriented hollow bodies released from the mold can, if desired, be collected in an oven for reheating after mold release, this oven being kept at a temperature below the heat distortion point. In fact, the inventors have found that this reheating treatment can significantly improve the stress crack resistance of the oriented hollow bodies.

It will be understood that the above description of the present invention is susceptible to various modifications, changes and adaptations, and the same are intended to be comprehended within the meaning and range of equivalents of the appended claims.

We claim:

1. Apparatus for the continuous production of oriented hollow bodies from a thermoplastic comprising:

parison producing means for producing a continuous tubular parison from a thermoplastic;

preform blowing means arranged to be fed with the continuous tubular parison for blowing the parison into preforms, said preform blowing means including molds aligned end to end contiguously on a first rotary carrier for each producing, by blowing, a separate preform having a true neck connected to one end of the body of the preform and possessing an annular bulge and a false neck connected to the end of the true neck which is remote from the body of the preform, the true neck corresponding to the neck of the finished oriented hollow body;

deflashing means for deflashing the necks of the preforms by removing the false necks thereof;

thermal conditioning means for bringing the preforms to their optimum orientation temperature;

final blowing means including a plurality of molds mounted on a second rotary carrier;

transfer means operatively associated with said preform blowing means, deflashing means, thermal conditioning means and final blowing means for conveying the preforms, and for continuously bringing the preforms in sequence from the preform blowing means, past said deflashing means and through said thermal conditioning means, and then to the final blowing means while moving them successively and continuously, said preform transfer means including carriers and a continuously moving endless chain on which said carriers are arranged to support the preforms in the region of their true necks which has already been molded, said endless chain undergoing a heat cycle along its path of travel and play existing between said endless chain and each of said blowing means, tending to produce slight fluctuations in the travel of said carriers in relation to both of said blowing means; a drive motor connected to drive said preform blowing means, said endless chain and said final blowing means for synchronizing the movement of said endless chain, in the region of said preform blowing means, with the discharge of preforms from said preform blowing means and, in the region of said final blowing means, with the introduction of preforms into said final blowing means; first drive coupling means connected to said motor for driving said first rotary carrier and said endless chain in the region of said preform blowing means; second drive coupling means connected to said motor for driving said second rotary carrier and said endless chain in the region of said final blowing means; and tensioning means for maintaining a selected tension in said chain over its path of travel from said preform blowing means to said final blowing means.

2. Apparatus as defined in claim 1 wherein said tensioning means inclucde two tensioning devices which are distributed over each segment of the endless chain between the two drive positions of the chain.

3. Apparatus as defined in claim 1 wherein the preform molds mounted on the first rotary carrier are equipped with blowing means including a movable hollow needle which penetrates into the cavity of the said molds and means for retracting the needle after partial opening of the molds.

4. Apparatus as defined in claim 3 wherein the blowing means comprises a hollow needle attached to a control block which is movable relative to the mold.

5. Apparatus as defined in claim 1 further comprising cooling means for internally cooling successive preforms by flushing with a cold fluid, said cooling means being driven by the transfer chain or by said drive motor and located between the deflashing means and the thermal conditioning means.

6. Apparatus as defined in claim 1 further comprising a reheating oven in which the oriented hollow bodies can dwell after having been extracted from the final blowing molds while being heated to a temperature below their heat distortion point.

7. Apparatus as defined in claim 1 wherein the preforms are conveyed by said transfer means with their necks directly upwardly and their longitudinal axes vertical, and the carriers are equipped with vertically arranged seats, of generally cylindrical shape and open at their upper part, for contacting the preforms in the region of their necks.

8. Apparatus as defined in claim 7 wherein the seats are open at their lower edges and are each defined by two articulated jaws which can move apart.

9. Apparatus as defined in claim 8 wherein the opening of the jaws is controlled by a cam which acts on a lever integral with one of the jaws.

10. Apparatus as defined in claim 1 wherein the preform blowing means, the endless chain and the final blowing means are all driven from a single rotating control shaft which is driven by the said motor.

11. Apparatus as defined in claim 1 wherein said drive motor is connected via said first and second coupling means for imparting a continuous movement to both said rotary carriers of said preform blowing means and said final blowing means.

* * * * *